United States Patent
Johnson et al.

(10) Patent No.: US 7,927,569 B2
(45) Date of Patent: Apr. 19, 2011

(54) METHODS FOR PRODUCING GALLIUM AND OTHER OXO/HYDROXO-BRIDGED METAL AQUO CLUSTERS

(75) Inventors: Darren W. Johnson, Eugene, OR (US); Elisabeth Rather Healey, Tampa, FL (US); Jason T. Gatlin, Eugene, OR (US); Zachary L. Mensinger, Eugene, OR (US)

(73) Assignee: State of Oregon Acting By and Through the State Board of Higher Education on Behalf of the University of Oregon, Eugene, OR (US)

( * ) Notice: Subject to any disclaimer, the term of this patent is extended or adjusted under 35 U.S.C. 154(b) by 0 days.

(21) Appl. No.: 12/541,889

(22) Filed: Aug. 14, 2009

(65) Prior Publication Data

US 2010/0068117 A1  Mar. 18, 2010

Related U.S. Application Data

(62) Division of application No. 11/352,445, filed on Feb. 9, 2006, now abandoned.

(60) Provisional application No. 60/651,582, filed on Feb. 9, 2005.

(51) Int. Cl.
*C01F 17/00* (2006.01)
*C01B 21/092* (2006.01)

(52) U.S. Cl. .................................. 423/263; 423/387

(58) Field of Classification Search ................. 423/395, 423/263, 387
See application file for complete search history.

(56) References Cited

OTHER PUBLICATIONS

Jeremy C. Goodwin, et al.; "How Do Clusters Grow? The Synthesis and Structure of Polynuclear Hydroxide Gallium (III) Clusters"; Angew. Chem. Int. Ed. 2004, 43, 4037-4041; Copyright 2004 Wiley-VCH Verlag GmbH & Co. KGaA, Weinhiem (5 pages).

Wilhelm Seichter, et al.; "Crystal Structure and Formation of the Aluminum Hydroxide Chloride [Al13(OH)24(H2O)24]Cl15 . 13 H2O"; Eur. J. Inorg. Chem. 1998 795-797; Copyright 1998 Wiley-VCH Verlag GmbH, D-69451, Weinhiem (3 pages).

Olga A. Gerasko, et al.; "Synthesis and Crystal Structure of Unprecedented Oxo/Hydroxo-Bridged Polynuclear Gallium(III) Aqua Complexes"; Inorganic Chemistry, vol. 44, No. 12, 2005 4133-4135; Copyright 2005 American Chemical Society (3 pages).

Sarah L. Heath, et al.; "Comparative X-ray and 27-AL NMR Spectroscopic Studies of the Speciation of Aluminum in Aqueous Systems: Al(III) Complexes of N(CH2CO2H)2(CH2CH20H)"; Journal of Inorganic Biochemistry 59, 785-794 (1995); Copyright 1995 Elsevier Science Inc.; New York (10 pages).

Elisabeth Rather, et al., "A Simple Organic Reaction Mediates the Crystallization of the Inorganic Nanocluster [Ga13(µ3-OH)6(µ2-OH)18(H2O)24](NO3)15"; J. Am. Chem. Soc., 2005, 127, 3242-3243; Copyright 2005 American Chemical Society (2 pages).

Wolfgang Schmitt et al; "[AL15(µ3-O)4(µ3-OH)6(µ-OH)14(hpdta)4]3×—A new Al15 Aggregate Which Forms a Supramolecular Zeotype"; Angew. Chem. Int Ed. 2001, 40, No. 19; Copyright 2001 Wiley-Vch Verlag GmbH, D-69451 Weinheim; 5 pages.

William H. Casey et al; A New Aluminum Hydroxide Octamer, [AL8(OH)14(H2O)18])SO4)5×16H2O Inorg. Chem. vol. 44, No. 14 (2005); Copyright 2005 American Chemical Society; 3 pages.

*Primary Examiner* — Wayne Langel
(74) *Attorney, Agent, or Firm* — Klarquist Sparkman, LLP (57) ABSTRACT

Metallic clusters can be produced by contacting a metal salt such as a metal nitrate with an organic reducing agent. Metals can be selected from a group consisting of metals exhibiting octahedral coordination, and nitrates of the selected metal or metals are contacted with, for example nitrosobenzene. Binary, tertiary, or other clusters can be produced.

10 Claims, 8 Drawing Sheets

METHODS FOR PRODUCING GALLIUM AND OTHER OXO/HYDROXO-BRIDGED METAL AQUO CLUSTERS

CROSS REFERENCE TO RELATED APPLICATIONS

This application is a divisional of U.S. patent application Ser. No. 11/352,445, filed Feb. 9, 2006, now abandoned and claims the benefit of U.S. Provisional Patent Application 60/651,582, filed Feb. 9, 2005, both of which are incorporated herein by reference.

TECHNICAL FIELD

The disclosure pertains to methods of producing oxo/hydroxo-bridged metal aquo nanoclusters.

BACKGROUND

Figure 6A:
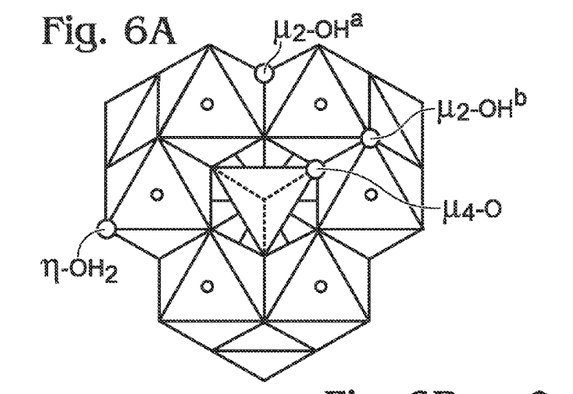
FIGS. 6A-6C are space-filling representations of $\epsilon$-Keggin, $Al_{13}$, $\delta$-Keggin ($Al_{13}$), and an $Al_{30}$ cluster, respectively.
Figures 6B, 6C:
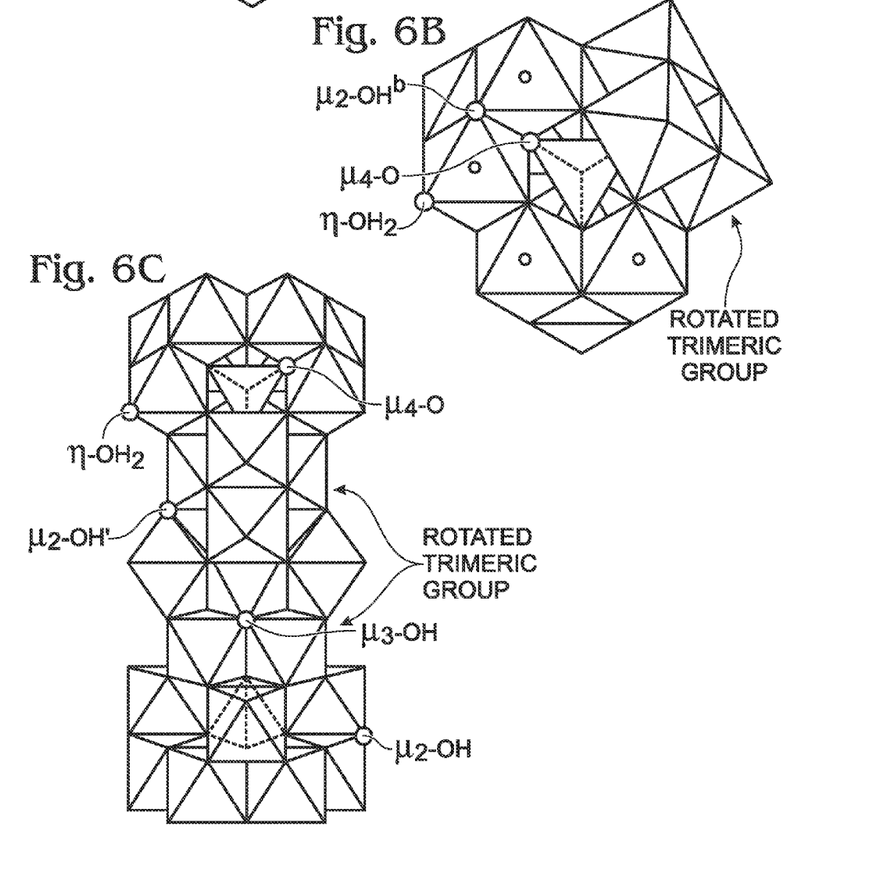

Several types of Keggin structures are known. Representative Keggin structures having a central tetrahedral Al(O)4 core are illustrated in FIGS. 6A-6C. These structures correspond to so-called ε-Keggin ($Al_{13}$), δ-Keggin ($Al_{13}$), and an $Al_{30}$ cluster. These and other Keggin structures are described in Casey et al., Reviews in Mineralogy & Geochemistry 44:167-190 (2001).

Figure 7A:
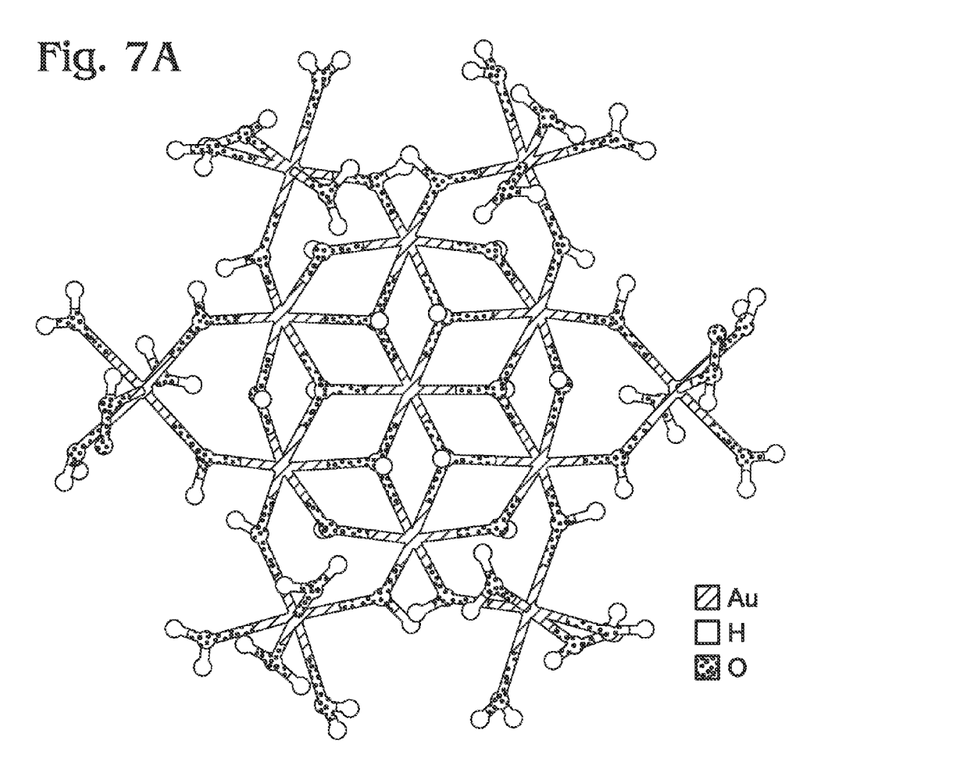
FIGS. 7A-7C illustrate $[Al_{13}(\mu_3\text{-}OH)_6(\mu_2\text{-}OH)_{18}(H_2O)_{24}]Cl_{15}$, $[Al_8(\mu_3\text{-}OH)_2(\mu_2\text{-}OH)_{12}(H_2O)_{18}](SO_4)_5$, and $[Al_{15}(\mu_3\text{-}O)_4(\mu_3\text{-}OH)_6(\mu_2\text{-}OH)_{14}(\text{hpdta})_4]^{3-}$, respectively.
Figure 7B:
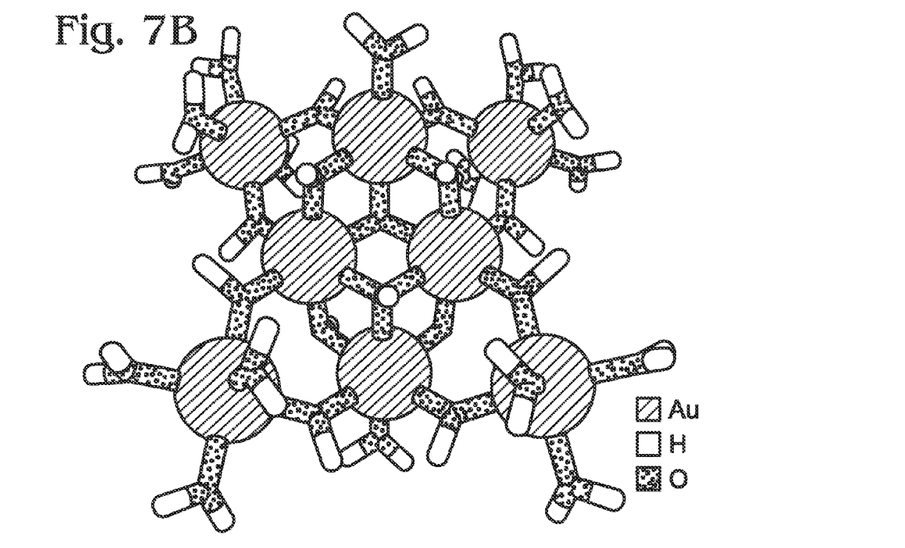
Figure 7C:
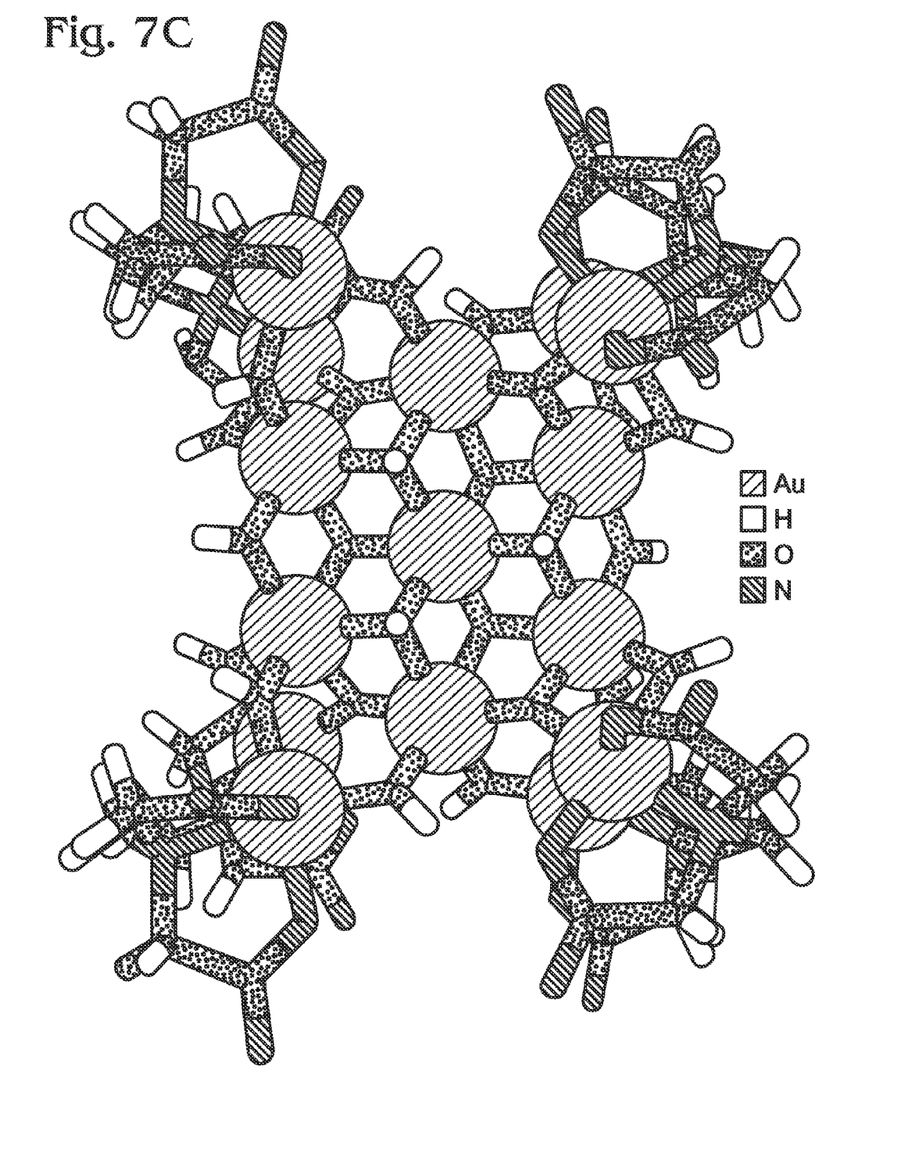

While these Keggin structures have potential practical applications, the synthesis of these structures limits their use. Synthesis of Keggin-like clusters typically involves lengthy reaction times and harsh reaction conditions. For example, synthesis of the Keggin-like Al cluster $[Al_{13}(\mu_3\text{-}OH)_6(\mu_2\text{-}OH)_{18}(H_2O)24]Cl_{15}$ requires a 4-5 month synthesis/crystallization procedure as reported by Seichter et al., Eur. J. Inorg. Chem. (1998). Synthesis of the Keggin-like Al cluster $[Al_8(\mu3\text{-}OH)_2(\mu2\text{-}OH)_{12}(H_2O)_{18}](SO_4)_5$ requires a 7 year synthesis/crystallization procedure as reported by Casey et al., Inorg. Chem. (2005). Synthesis of the Keggin-like Al cluster $[Al_{15}(\mu3\text{-}O)_4(\mu3\text{-}OH)_6(\mu_2\text{-}OH)_{14}(\text{hpdta})]_3$ requires an 8 day ligand-shell stabilized synthesis as reported in Schmitt et al., Angew. Chem. (2001). For convenience, diagrams of these $Al(O)_6$ core materials are shown in FIGS. 7A-7C.

Because of the limitations of conventional synthesis, improved synthesis methods are needed, and new synthetic products made available by such improved synthesis methods.

SUMMARY

Nanoscale inorganic clusters can be formed synergistically with a mild organic oxidation reaction. A tridecameric cluster $[Ga_{13}(\mu_3\text{-}OH)_6(\mu\text{-}OH)_{18}(H_2O)_{24}](NO_3)_{15}$ (referred to herein as $Ga_{13}$) forms when a mild organic reducing agent (such as nitrosobenzene) facilitates the conversion. This is an example of an organic reaction mediating an inorganic transformation, and provides a link between organic and inorganic synthesis that allows both processes to occur under aerobic, ambient conditions with good yields. Previous syntheses of inorganic clusters suffer from extremely long reaction times (months to years), harsh conditions, and/or poor yields. The mild organic oxidation reaction can be tolerant to many functional groups, and other mild organic oxidation reactions can be similarly implemented.

The representative clusters described herein have applications in areas ranging from environmental chemistry (mimics for mineral surfaces) to the cracking of gas oil (pillaring agents for montmorillonite clay catalysts). Other nanocluster applications include: models for the active sites of minerals for catalysis, single molecule magnets (with magnetic or paramagnetic metal ions), magnetic memory devices, conductive/semiconductive metal oxide layers for circuits and integrated circuits, high-density metal-based contrast agents (e.g., $^{67}Ga$ positron emission tomography (PET) contrast agents), osmotic-type molecular transport phenomena using the high charge of the clusters, environmental remediation of toxic metal ions, and the use of the clusters as synthons for materials via aquo ligand exchange reactions.

Conventional syntheses of these clusters typically involve traditional inorganic methods: ligand exchange, oxidation of metal(0) starting materials, salt metathesis, acid/base hydrolysis, etc. Disclosed herein are novel synthetic strategies in which a simple organic reaction is used to facilitate the formation of tridecameric clusters such as gallium clusters. For example, by using $Ga(NO_3)_3 \cdot (H_2O)_6$ as a reagent for the extremely mild conversion of nitrosobenzene to nitrobenzene, robust crystals of the nitrate-deficient gallium cluster $[Ga_{13}(\mu_3\text{-}OH)_6(\mu\text{-}OH)_{18}(H_2O)_{24}](NO_3)_{15}$ have been formed as described in detail below. The novel synthesis described herein can generate, for example, gallium, aluminum, or other clusters with high yields in times ranging from about a few hours, a few days, or a few weeks under ambient, aerobic conditions.

Solid state and solution investigations of group 13 clusters reveal that the majority of the compounds are polyoxocations based upon the modified-Keggin structure, which possesses octahedral peripheral metal cations bridged to a central tetrahedral M(III) ion. While the presence of chelating organic ligands stabilizes a range of "Keggin-like" polynuclear clusters (where the central metal ion is octahedral rather than tetrahedral) and allows for their crystallization, isolation of the purely inorganic Ga(III) clusters analogous to the Keggin-like $Al_{13}$ clusters has not been previously accomplished. As described herein, a straightforward method has been developed to prepare clusters such as $Ga_{13}$ using a simple organic reaction to drive the formation of the crystalline inorganic cluster.

The present disclosure is directed to synthesis methods that can form previously synthesized inorganic clusters or previously unavailable inorganic clusters. The synthesis methods are typically based on functional group tolerant organic oxidations that occur under "mild" conditions, i.e., typically do not require temperature, pressure, or pH extremes, or lengthy reaction times. Inorganic clusters based on gallium, aluminum, and combinations of indium and gallium are described in detail. For convenience, these clusters are referred to as $M_{13}$ or $N_A M_B$, wherein M, N refer to metallic species, and for the binary cluster $N_A M_B$, A+B=13. Representative clusters include $Ga_{13}$, $Al_{13}$, $Ga_7In_6$, and $GaAl_{12}$.

One aspect of the present disclosure includes novel compounds, compositions and methods for using such compounds and compositions for use in scintigraphy or PET or other diagnostic imaging applications.

The foregoing and other features and advantages of the disclosed technology will become more apparent from the following detailed description, which proceeds with reference to the accompanying drawings.

DETAILED DESCRIPTION

The following explanations of terms and methods are provided to better describe the present compounds, compositions, and methods, and to guide those of ordinary skill in the art in the practice of the present disclosure. It is also to be understood that the terminology used in the disclosure is for the purpose of describing particular embodiments and examples only and is not intended to be limiting.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be understood to have the following meanings. "Optional" or "optionally" means that the subsequently described event or circumstance can but need not occur, and that the description includes instances where said event or circumstance occurs and instances where it does not. "Nanoscale" cluster compounds or "nanocluster" generally refers to clusters having dimensions of from about 0.1 nm to 200 nm, preferably between about 0.2 nm and 100 nm, more preferably between about 0.5 nm and 50 nm, and still more preferably between about 1 nm and 5 nm. In one representative example, a gallium nanocluster is disk shaped and has a diameter of about 2 nm and a thickness of about 1 nm. Materials are referred to as soluble or appreciably soluble if millimolar concentrations can be achieved under typical reaction conditions such as ambient temperatures.

Cluster Synthesis

Disclosed herein are methods based on organic reactions that result in metallic clusters such as a tridecameric gallium cluster or other clusters. A representation of a generic synthesis is illustrated in Formula 1.

Metal salts generally are selected from a group consisting of salts of aluminum, germanium, indium, gallium, iron, manganese, nickel, lanthanides such as, for example, samarium, europium, and terbium, or other metals having octahedral coordination geometry. Metal nitrates are convenient, although metal sulfates, metal carbonates, metal phosphates and other metal salts of oxyanions can be used. The solvent is generally selected so that both the organic reducing agent and the metal salt are soluble in the solvent. Methanol, ethanol, or other alcohols can be suitable depending on solubility of the organic reducing agent and the metal salt. Although not shown in Formula 1, solvent pH and temperature can be selected to enhance production of the metal cluster. Metal species associated with more acidic Lewis acids may react more favorably if the solvent pH is adjusted to become slightly basic, but a range of pH values from about 2 to about 13 may typically be used.

The organic reducing agent (ORA) is typically selected to reduce the metal salt by, for example, reducing a constituent of the ligand to which a metallic species in the metal salt is bound. For example, some suitable metal salts are metal nitrates, and the ORA is selected to reduce a nitrate group to a nitrite group. Representative ORAs include nitrosobenzene, nitroalkanes and bromonitoalkanes (from oximes), sulfoxides, and phosphines.

Some suitable ORAs include nitroso compounds that can be represented by the formula R—N=O, wherein R is an aliphatic or aromatic moiety. Nitrosamines having a chemical formula $R_2$—N—N=O. In one embodiment, R includes at least one site of unsaturation, which may be conjugated to the nitrosamine moiety. For example, certain nitrosamines are directly attached to an alkenyl moiety. Other examples of conjugated nitrosamines include aryl nitrosamines, such as optionally substituted phenyl nitrosamines.

The term "aliphatic group" includes alkyl, alkenyl, alkynyl, halogenated alkyl and cycloalkyl groups. A "lower aliphatic" group is a branched or unbranched aliphatic group having from 1 to 10 carbon atoms.

The term "aryl group" refers to any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorous. The aryl group can be substituted with one or more groups including, but not limited to, alkyl, alkynyl, alkenyl, aryl, halide, nitro, amino, ester, ketone, aldehyde, hydroxy, carboxylic acid, or alkoxy, or the aryl group can be unsubstituted.

The oxidation associated with such ORAs, such as the oxidation of nitrosoaromatics to nitroaromatics, are generally a mild oxidations that exhibit wide functional group tolerance. Functional group tolerance can be evaluated and functional groups selected based on the scheme illustrated in Formula 2. As shown in Formula 2, diverse substrates including electron-withdrawing to electron-donating substituents can be evaluated and selected.

Formula 1

Formula 2

There are numerous mild organic oxidation reactions that can be used to drive cluster synthesis such as, for example, the oxidation of phosphines to phosphine oxides and sulfoxides to sulfones. Examples are illustrated in Formula 3 and Formula 4 below. With such reactions, synthesis of an inorganic nanocluster drives the organic reaction.

Formula 3

Formula 4

Synthesis based on oximes and nitrosoalkanes is illustrated in Formula 5. Since oximes and nitrosoalkanes are tautomers, and equilibrium lies far to the oxime, a mild oxidation of a nitrosoalkane to a nitroalkane can be accomplished using metal nitrates, provided sufficient nitrosoalkane is present in solution. A wide array of oximes is readily available and can be based on aliphatic or aromatic moieties such as those described with reference to nitrosamines.

Formula 5

In another example, bromination of an oxime to a bromonitroso compound, followed by mild oxidation to a bromonitroalkane can be used to produce a nitroalkane upon reduction with sodium borohydride. This procedure is illustrated in Formula 6. In Formula 6, NBS represents n-bromosuccinimide, and R represents any of the moieties described previously.

Formula 6

Combinations of metal salts of metals M and N can be used to produce an $N_aM_b$ cluster. For example, while a cluster of 13 gallium atoms has been produced, in other syntheses, a cluster based on 7 gallium atoms and 6 indium atoms was produced. Other binary, tertiary, or higher order clusters can also be produced. For binary tridecameric clusters, a sum of numbers of M-type ions and N-type ions ($N_a$ and $N_b$, respectively) is thirteen, so that various numbers of atoms of each of the binary constituent can be used, subject to the constraint $N_a+N_b=13$. Similar considerations apply to tertiary clusters, wherein a sum $N_a+N_b+N_c=13$, wherein $N_c$ refers to a number of ions of a third metallic constituent.

Example

Gallium Clusters

In an example shown in Formula 7, $Ga(NO_3)_3 \cdot (H_2O)$ is used as a reagent for the mild conversion of nitrosobenzene to nitrobenzene, forming crystals of a nitrate deficient gallium cluster. In additional examples, other inorganic clusters can be made, and functional groups other than the nitroso group can be used for the organic portion of the reaction.

Formula 7

In Formula 7, the symbols $\mu$ and $\mu_3$ refer to the numbers of gallium atoms bridged by the OH groups, with $\mu$ referring to the 18 OH groups that bridge two gallium atoms and $\mu_3$ referring to the six OH groups that bridge three gallium atoms. In some examples, $\mu_2$ is used to denote groups bridging two gallium atoms instead of $\mu$. The same notation can be used in describing other cluster compounds as well.

In the representative synthesis of a gallium cluster illustrated in Formula 7, robust crystals of $[Ga_{13}(\mu_3\text{-}OH)_6(\mu\text{-}OH)_{18}(H_2O)_{24}](NO_3)_{15} \cdot 6H_2O$ (referred to herein as $Ga_{13}$) were obtained in 65% yield from slow evaporation at room temperature of a methanolic solution of hydrated $Ga(NO_3)_3$ in the presence of stoichiometric amounts of nitrosobenzene. In this process the nitrosobenzene acts as a scavenger of nitrate ions and facilitates the synthesis of $Ga_{13}$ via a redox reaction in which the nitrosobenzene is oxidized to nitrobenzene with concomitant reduction of some of the nitrate counterions LC-MS and $^1H$ NMR data verified that nitrobenzene was formed during the reaction. Furthermore, it is known that nitric acid can oxidize nitroso derivatives into the corresponding nitro compounds. This procedure represents a milder form of this reaction, in which a nitrate oxidizes nitrosobenzene at a slightly acidic pH. As a result of consumption of some of the nitrate counterions of $Ga(NO_3)_3$, the remaining gallium-containing species form a higher nuclearity cluster where the ratio of nitrate to gallium(III) is less than 3:1—in this case, the stoichiometric ratio is 15:13.

The solid state structure of $Ga_{13}$ is shown in FIGS. 1A-2B. The gallium cluster compound crystallizes as the Keggin-like cluster similar to other tridecameric gallium clusters stabilized by supporting ligands, wherein the central gallium is octahedral and surrounded by two concentric rings of six gallium ions each, with bridging hydroxo ligands between them. The cluster is capped on its periphery by 24 aquo ligands generating a nanoscale disk-like compound with a diameter of about 1.81 nm and a thickness of about 1.03 nm. $Ga_{13}$ is expected to persist in solution. $Ga_{13}$ is water-soluble, and upon recrystallization from aqueous solution, $Ga_{13}$ is regenerated, rather than decomposing to a mixture of $Ga_2O_3$, Ga(O)OH, $Ga(OH)_3$ and/or $Ga(NO_3)_3$.

Gallium Clusters

Experimental

Figure 1A:
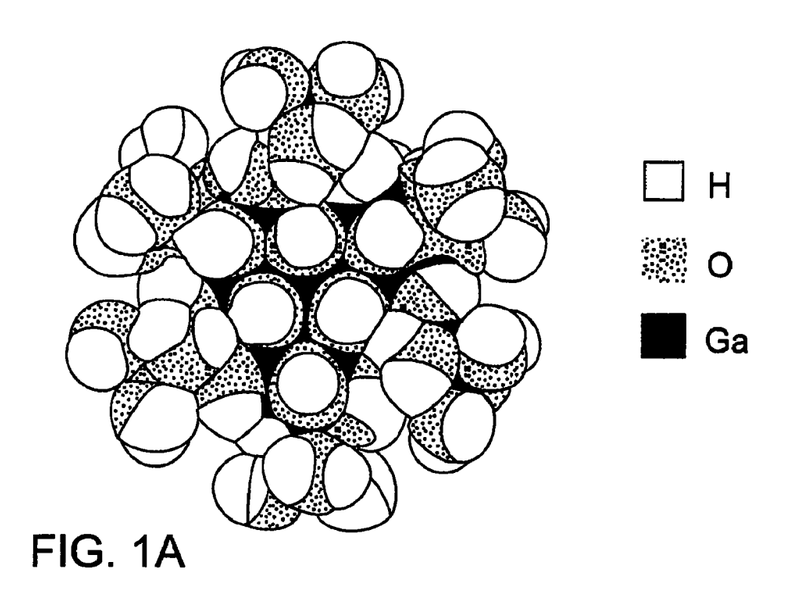
FIGS. 1A-1B are space-filling representations of a single crystal X-ray structure of a $Ga_{13}$ nanocluster.
Figure 1B:
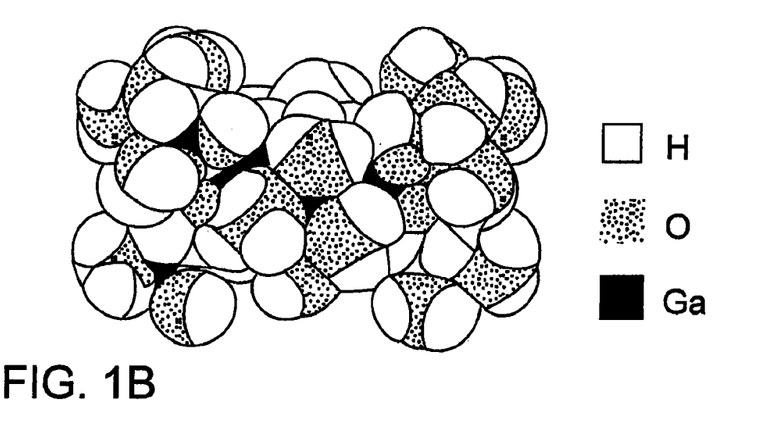
Figure 2A:
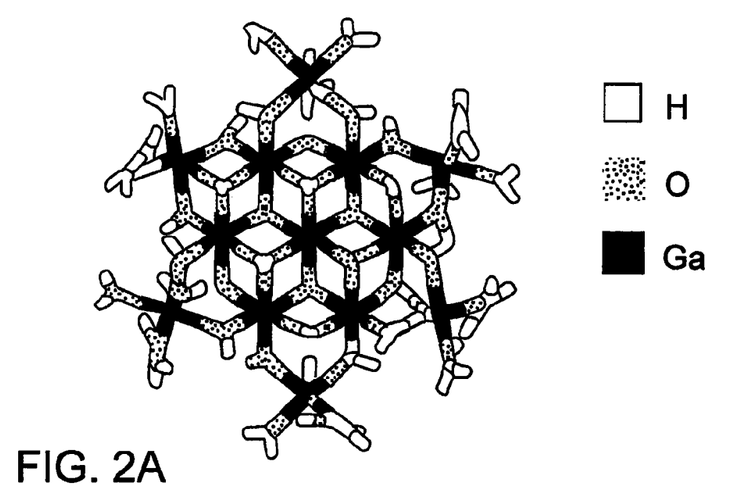
FIGS. 2A-2B are wireframe representations of a single crystal X-ray structure of a $Ga_{13}$ nanocluster.
Figure 2B:
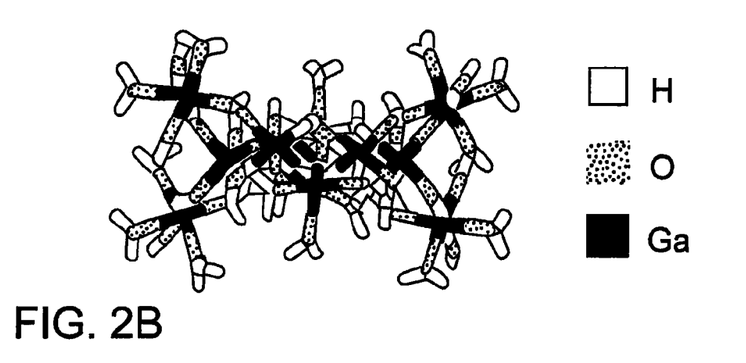
Figure 3A:
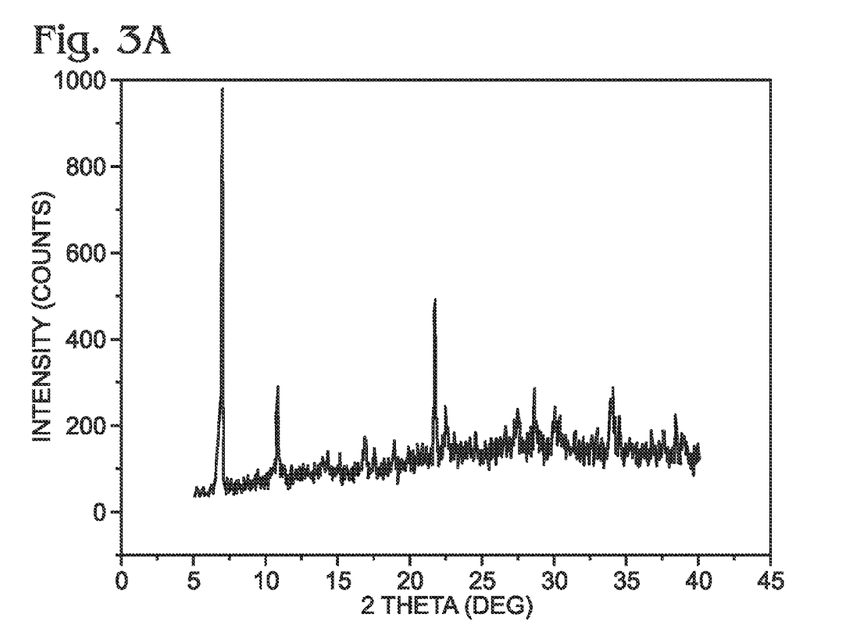
FIG. 3A is an X-ray powder diffraction pattern obtained from $Ga_{13}$ produced as described herein.
Figure 3B:
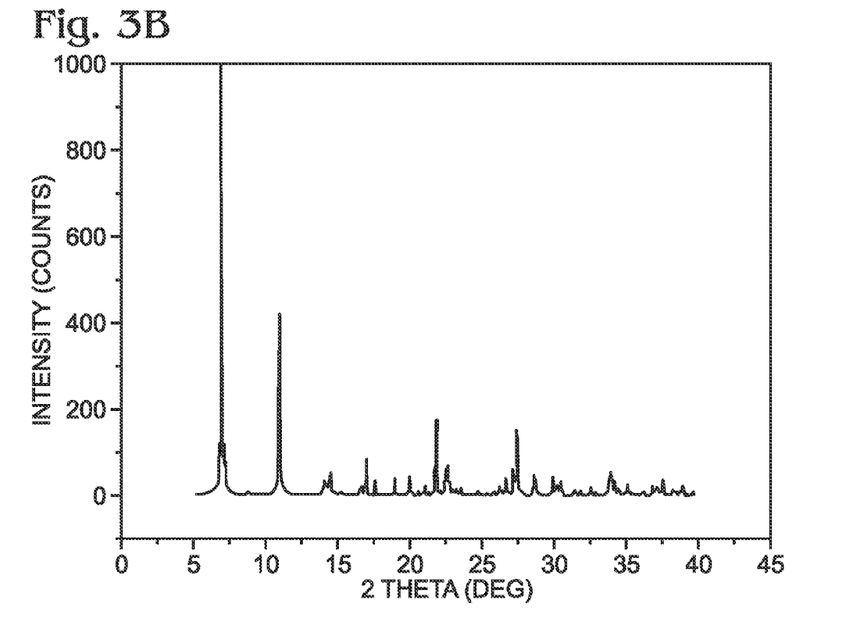
FIG. 3B is an X-ray power diffraction pattern obtained by calculation.
Figure 4A:
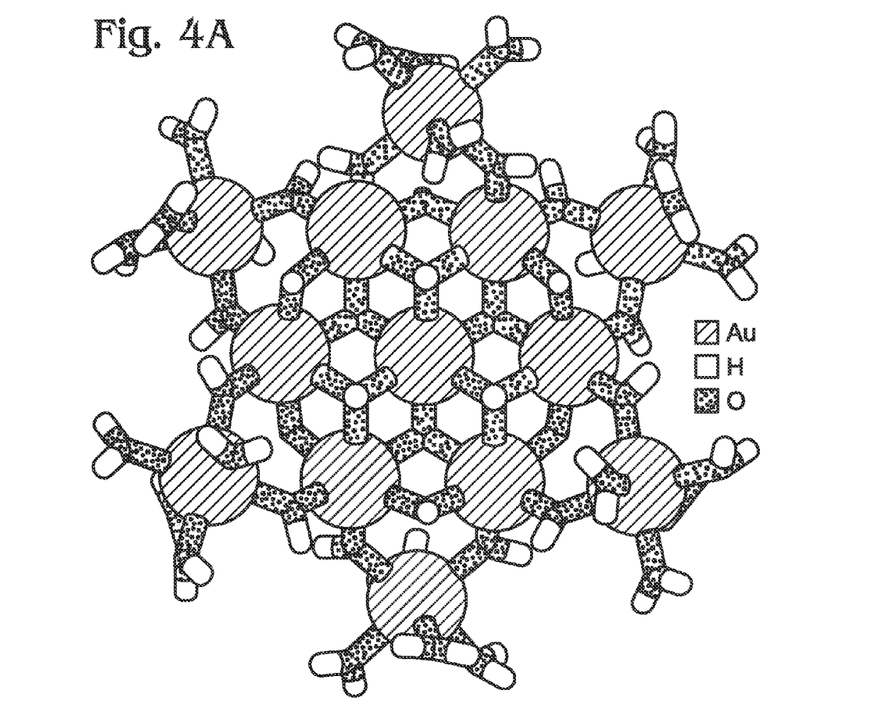
FIGS. 4A-4B are space-filling representations of $Al_{13}$ derived from the measured single crystal X-ray structure of $Al_{13}$.
Figure 4B:
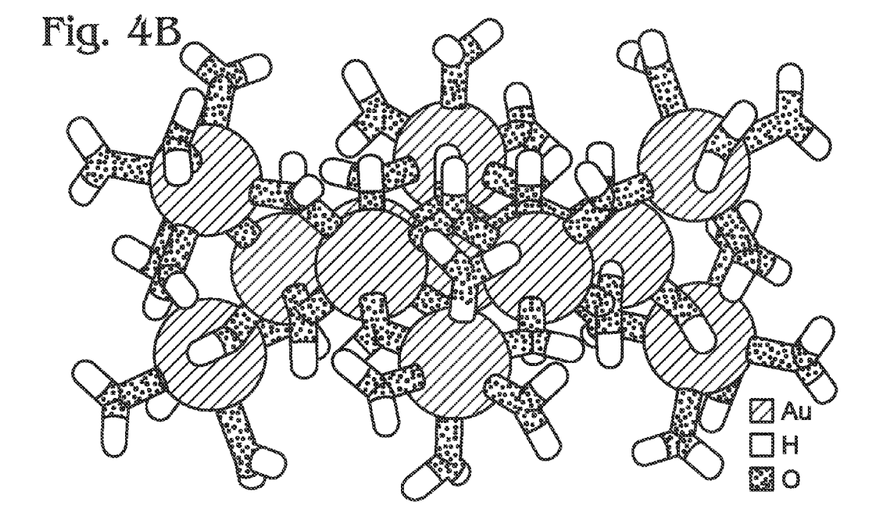
Figure 5A:
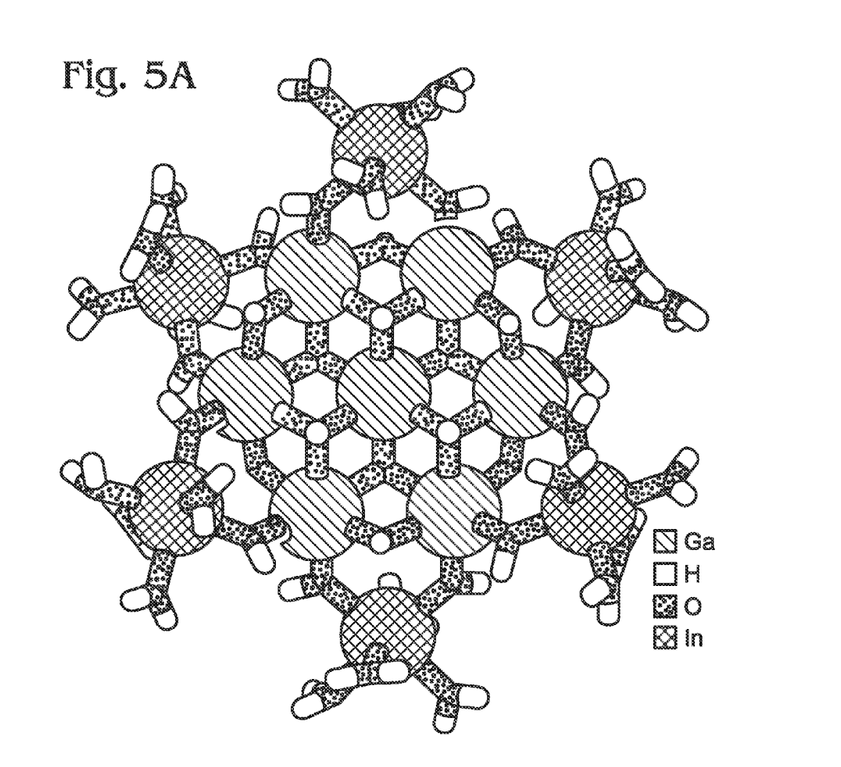
FIGS. 5A-5B are space-filling representations of $In_6Ga_7$ derived from the measured single crystal X-ray structure of $In_6Ga_7$.
Figure 5B:
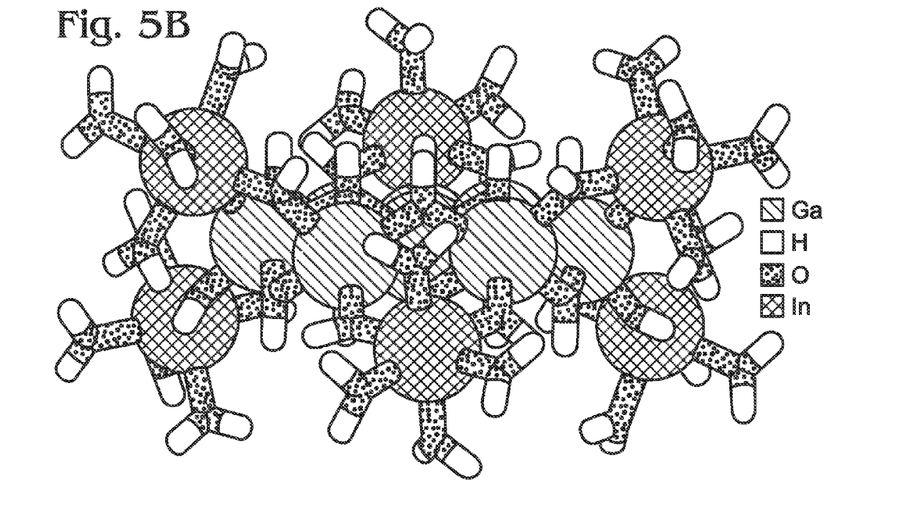

Slow evaporation of a 5 mL methanolic solution of $Ga(NO_3)_3 \cdot 6H_2O$ (0.47 g, 0.13 mmol) in the presence of nitrosobenzene (0.025 g, 0.24 mmol) yielded 0.018 g (0.0065 mmol, 65%) of $Ga_{13}$. Crystals of the product were shown to be representative of the bulk by comparison of the X-ray powder pattern collected on a fresh sample with the corresponding pattern calculated from the crystal structure. X-ray powder spectra based on the reaction product and calculated based on the crystal structure are shown in FIGS. 3-4, respectively. Various $Ga_{13}$ cluster parameters based on single crystal X-ray diffraction measurements are listed in the table below.

| $Ga_{13}$ Summary |
|---|
| Avg. Ga—O: 1.97 Å |
| Trigonal, R-3 |
| a = 20.214(3) Å, c = 18.353(4) Å |
| $\alpha = \beta = 90.00°, \gamma = 120°$ |
| V = 6494(2) Å 3, Z = 3 |
| R1 = 0.0349 |
| wR2(all) = 0.0988 |
| GOF = 1.035 |

In the synthesis, the original light blue solution of nitrosobenzene and $Ga(NO_3)_3 \cdot 6H_2O$ turns pale green after one day indicating oxidation of nitrosobenzene to nitrobenzene. The pH of a solution of $Ga_{13}$ dissolved in water (1.6 nM) was measured as 2.28. Dissolution of $Ga_{13}$ in water followed by recrystallization via evaporation resulted in the sole formation of $Ga_{13}$ as determined by single crystal unit cell determination and X-ray powder diffraction. The entire synthesis can be completed in less than a week. Attempts to produce $Ga_{13}$ in the presence of water alone, pyridine, 2,6-lutidine, and nitrobenzene were unsuccessful and resulted in the formation of $Ga(NO_3)_3$ or $GaL_2 (NO_3)_3$, wherein L is 2,6-lutidine.

Other Clusters

The Keggin-like $Al_{13}$ cluster has been conventionally synthesized as both the Cl⁻ salt and with supporting aminocarboxylate ligands. However, conventional synthesis methods are difficult and require months to complete. The procedure describe herein for the formation of $Ga_{13}$ clusters by the organic oxidation of nitrosobenzene and crystallization of the $Ga_{13}$ cluster can be viewed as a generic reaction applicable to the synthesis of isostructural analogous $Al_{13}$ clusters or other isostructural clusters. Using the disclosed organic mediated reaction, the $Al_{13}$ cluster can be isolated in less than 2 weeks.

The general strategy for making a cluster is to dissolve both the metal salt (13 equivalents) and the nitrosobenzene (24 equivalents) in methanol, mix them together and, for aluminum clusters, add 0.1 equivalent of methanolic KOH to adjust pH. The mixture is allowed to slowly evaporate over 4-8 days, yielding large single crystals (about 65% yield) for single crystal X-ray diffraction and elemental analysis. For aluminum nitrate, $Al_{13}$ clusters are produced having a formula $[Al_{13}(\mu_3\text{-}OH)_6(\mu\text{-}OH)_{18}(H_2O)_{24}](NO_3)_{15}$, wherein $\mu_3$ and $\mu$ refer to OH groups that bridge 3 or 2 aluminum ions, respectively. The aluminum cluster reaction proceeds with about a 65% yield with respect to metal salt. Selection of the numbers of equivalents of the reactants can be associated with reaction rate, but typically the same product is obtained with a range of equivalents of the reactants.

This procedure can be applied to other metals and metal mixtures to synthesize clusters containing gallium and/or indium. Mixing thirteen equivalents of gallium nitrate with nitrosobenzene in methanol with no added base produced the $Ga_{13}$ cluster. A mixed metal cluster of gallium and indium was synthesized using 7 equivalents of gallium nitrate and 6 of indium nitrate to produce $Ga_7In_6$ clusters with a chemical formula of $[Ga_7In_6(\mu_3\text{-}OH)_6(\mu\text{-}OH)_{18}(H_2O)_{24}](NO_3)_{15}$. These clusters have both been produced and structurally characterized by single crystal X-ray diffraction. The presence of nitrobenzene as a product was verified by $^1H$ NMR spectroscopy and LC mass spectrometry. The production of these clusters is described with additional detail below, and the general procedure is outlined in Formula 8.

Formula 8

Aluminum Clusters

Formula 9 illustrates a synthesis of $Al_{13}$ using a method similar to that described above for $Ga_{13}$. The polymerization equilibria of aluminum species is dependent on pH, concentration of base and aluminum (they form readily with $[Al^{3+}] > 10^{-5}$ M), stirring rate, temperature, aging time and rate of base addition. Because aluminum is more acidic than gallium, the concentration of $Al(NO_3)_3$ and pH may be adjusted (from pH 2-13).

Formula 9

Some of the measured single crystal x-ray structural properties of these aluminum clusters are listed in the table below.

| $Al_{13}$ Summary |
|---|
| Triclinic, P-1 |
| a = 12.86 Å, b = 13.17 Å, c = 13.43 Å |
| α = 78.27°, β = 74.15°, γ = 87.96° |
| V = 2143 Å3, Z = 1 |

Other $M_{13}$ nanoclusters can be formed by the treatment of a hydrated $M(NO_3)_3$ with nitrosobenzene. For example, $In_{13}$ clusters and binary clusters such as $Ga_7In_6$ can be produced as illustrated in Formula 10. $Ga_7In_6$ has been produced such that the seven Ga ions are situated at the innermost sites in the cluster. A summary of $Ga_7In_6$ properties based on single crystal X-ray diffraction measurements is included in the table below. Other clusters include $GeAl_{12}$, $Fe_{13}$, and $Mn_{13}$ clusters, and can be produced using, for example, either a hydrated metal nitrate or in the presence of water.

Formula 10

| $Ga_7In_6$ Summary |
|---|
| Trigonal, R-3 |
| a = 20.41 Å, b = 20.41 Å, c = 18.36 Å |
| α = β = 90°, γ = 120° |
| V = 6621 Å3, Z = 3 |

Higher Order Clusters

In addition to the clusters described above, higher nuclearity versions of these cluster types can be formed. Typically these larger clusters are formed by stabilizing the core with peripheral ligands or by exposure of smaller nuclearity clusters to base over time. Stable $M_{13}$ or other clusters can be exposed to an ORA such as nitrosobenzene and base in a methanolic or aqueous solution. Slow evaporation and/or heating can yield higher nuclearity clusters devoid of stabilizing non-aquo ligands as illustrated in Formula 11.

Formula 11

While clusters based on 13 or 30 metal ions have been described, other cluster configurations can be selected. For example, clusters having 8, 13, 30, or 32 metal ions can be produced.

Pharmaceutical Applications

While there are numerous applications of the disclosed compounds, one of particular significance is use in pharmaceutical compositions. Such compositions are prepared for administration to a subject and include a diagnostically effective amount of one or more of the currently disclosed compounds. The diagnostically effective amount of a disclosed compound will depend on the route of administration, the type of mammal that is the subject and the physical characteristics of the subject being investigated. Specific factors that can be taken into account include disease severity and stage, weight, diet and concurrent medications. The relationship of these factors to determining a diagnostically effective amount of the disclosed compounds is understood by those of ordinary skill in the art. Therapeutically effective amounts are subject to similar considerations.

Any of the nanocluster compositions described herein can be combined with a pharmaceutically acceptable carrier to form a pharmaceutical composition. Pharmaceutical carriers are known to those skilled in the art. These most typically would be standard carriers for administration of compositions to humans, including solutions such as sterile water, saline, and buffered solutions at physiological pH. The compositions could also be administered intramuscularly, subcutaneously, or in an aerosol form. Other compounds will be administered according to standard procedures used by those skilled in the art.

Nanoclusters intended for pharmaceutical delivery can be formulated in a pharmaceutical composition. Pharmaceutical compositions can include carriers, thickeners, diluents, buffers, preservatives, surface active agents and the like in addition to the molecule of choice. Pharmaceutical compositions can also include one or more additional active ingredients such as antimicrobial agents, anti-inflammatory agents, anesthetics, and the like. Pharmaceutical formulations can include additional components, such as carriers. The pharmaceutically acceptable carriers useful for these formulations are conventional. Remington's Pharmaceutical Sciences, by E. W. Martin, Mack Publishing Co., Easton, Pa., 15th Edition (1975), describes compositions and formulations suitable for pharmaceutical delivery of the compounds herein disclosed.

In general, the nature of the carrier will depend on the particular mode of administration being employed. For instance, parenteral formulations usually contain injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Diagnostic tests based on gallium nanoclusters permit investigation of how a subject's body processes the composition containing the nanoclusters, and typically include images based on radioactivity associated with the nanoclusters. For example, the nanoclusters can be chemically bound to a substance that has a particular processing characteristic within the body (i.e., the substance acts as a tracer). Presence of disease or abnormality is then associated with abnormal or unusual processing of the substance by the body. In some examples, accumulation of a substance is enhanced due to disease while in other examples, the substance is excluded from a region in which it would normally accumulate. Accumulation of a substance is associated with a "hot spot" in an image while exclusion of a substance is associated with a "cold spot."

For example, nanoclusters can be attached to a substance that is preferentially accumulated in a particular body region or tissue (such as for example, bone, kidneys, lungs, etc.). The accumulation (or lack thereof) can be used in imaging. Increased physiological function such as associated with, for example, bone fracture, can result in abnormally high accumulation of the substance and produces a hot spot in an image. In other examples, the substance is excluded due to disease or injury.

Nanoclusters and nanocluster compositions can be used in in-vivo and in-vitro analysis. In-vivo analysis is based on subject evaluations using, for example, gamma camera imaging or non-imaging measurement of radioactivity in the subject. In-vitro analysis is typically based on samples extracted from a subject such as, for examples, blood or urine samples.

Radioisotopes can be produced using, for example, a nuclear reactor or a cyclotron. Gallium 67 can be produced by bombardment of zinc with energetic protons using a cyclotron. In some cases, a zinc target is exposed so as to be substantially free of stable gallium isotopes. Other isotopes of gallium or radioactive indium can also be used in imaging applications.

Compositions can be applied for patient imaging in various ways. For example, a liquid containing a nanocluster composition can be injected intravenously. Subcutaneous injection can also be used, wherein the composition is injected under the skin. In other examples, intrasynovial injection is used, wherein the composition is injected into a joint space. In other examples, a composition is inhaled for use in lung investigations or ingested for evaluation and study of digestive tract function. In further examples, a composition can be applied topically. For a particular application, a composition can be configured as, for example, an aerosol dispersion, an ingestible substance (included with a food), or in a sterile, injectable carrier.

The gallium compounds described herein may be formed using one or more gallium isotopes such as the radioactive isotopes gallium 66, gallium 67, and/or gallium 68. Such radioactive gallium compounds may be used in imaging applications in, for example, nuclear medicine. Gallium 67 emits gamma radiation, and the gamma emission from such compounds may be applied to gamma scintigraphy in which a gamma camera or a SPECT (single photon emission computed tomography) camera is used for imaging. Alternatively, such compounds may be used in positron emission tomography (PET) in which photons produced in positron decay are detected. In medical applications, such compounds may be injected into patients, and a distribution of compound in the patient detected. Such compounds can be referred to as contrast agents in these and other imaging techniques. Similar methods may be used to form radioactive indium compounds.

Radiation emitted from the radionuclide inside the body is usually detected using a gamma camera. Traditionally, gamma-cameras have consisted of a gamma-ray detector, such as a single large sodium iodide NaI(Tl) scintillation crystal, coupled with an imaging sub-system such as an array of photomultiplier tubes and associated electronics.

The technology has been described with reference to example embodiments. It will be apparent to those of ordinary skill in the art that changes and modifications may be made without departing from the teachings of this disclosure, and we claim all that is encompassed by the appended claims.

We claim:

1. A composition, having a formula $[Ga_{13}(\mu_3\text{-}OH)_6(\mu\text{-}OH)_{18}(H_2O)_{24}](NO_3)_{15}$, wherein $\mu_3$ denotes a number of OH groups bridging three atoms of Ga, and $\mu$ denotes a number of OH groups bridging two atoms of Ga.

2. A composition, having a formula $[Ga_7In_6(\mu_3\text{-}OH)_6(\mu\text{-}OH)_{18}(H_2O)_{24}](NO_3)_{15}$, wherein $\mu_3$ denotes a number of OH groups bridging three atoms of Ga or In, and $\mu$ denotes a number of OH groups bridging two atoms of Ga or In.

3. A composition, comprising a metal cluster having the formula $[M_{13}(\mu_3\text{-}OH)_6(\mu\text{-}OH)_{18}(H_2O)_{24}](X)_n$, wherein each M is independently Mn, Fe, In, Ni, Ge, Eu, Tb, or Sm, $\mu_3$ denotes a number of OH groups bridging three atoms of M, $\mu$ denotes a number of OH groups bridging two atoms of M, X is a counterion, and n is selected to balance the formal charge of the metal cluster.

4. A composition, comprising a metal cluster having the formula $[M_{13}(\mu_3\text{-}OH)_6(\mu\text{-}OH)_{18}(H_2O)_{24}](X)_n$, wherein each M is independently Ga or In, $\mu_3$ denotes a number of OH groups bridging three atoms of M, $\mu$ denotes a number of OH groups bridging two atoms of M, X is a counterion, and n is selected to balance the formal charge of the metal cluster.

5. The composition of claim 4, wherein the metal cluster has the formula $[Ga_{13}(\mu_3\text{-}OH)_6(\mu\text{-}OH)_{18}(H_2O)_{24}](X)_n$, $[Ga_7In_6(\mu_3\text{-}OH)_6(\mu\text{-}OH)_{18}(H_2O)_{24}](X)_n$, or $[GaAl_{12}(\mu_3\text{-}OH)_6(\mu\text{-}OH)_{18}(H_2O)_{24}](X)_n$.

6. A composition, comprising a metal cluster having the formula $[M'_AN_B(\mu_3\text{-}OH)_6(\mu\text{-}OH)_{18}(H_2O)_{24}](X)_n$; where M' and N represent a first metal and a distinct second metal that exhibit octahedral coordination geometry, respectively; X is a counterion, and n is selected to balance the formal charge of the metal cluster; and A and B are integers greater than or equal to 1 such that A+B=13.

7. The composition of claim 6, wherein M' and N are selected from a group consisting of Al, Mn, Fe, Ga, In, Ni, Ge, Eu, Tb, and Sm.

8. A composition, comprising a metal cluster having the formula $[M'_AN_BQ_C(\mu_3\text{-}OH)_6(\mu\text{-}OH)_{18}(H_2O)_{24}](X)_n$; where M', N, and Q represent a first metal, a distinct second metal, and a distinct third metal that each exhibit octahedral coordination geometry, respectively; X is a counterion, and n is selected to balance the formal charge of the metal cluster; and A, B, and C are integers greater than or equal to 1 such that A+B+C=13.

9. The composition of claim 8, wherein M', N, and Q are selected from a group consisting of Al, Mn, Fe, Ga, In, Ni, Ge, Eu, Tb, and Sm.

10. A composition, comprising a metal cluster having the formula $[M_{13}(\mu_3\text{-}OH)_6(\mu\text{-}OH)_{18}(H_2O)_{24}](X)_n$, wherein each M is independently Mn, Fe, Ga, In, Ni, Ge, Eu, Tb, or Sm; $\mu_3$ denotes a number of OH groups bridging three atoms of M; $\mu$ denotes a number of OH groups bridging two atoms of M; X is a counterion; and n is selected to balance the formal charge of the metal cluster.

* * * * *